April 17, 1956 E. H. BECK Re. 24,142

SKIVING MACHINE

Original Filed April 23, 1953 3 Sheets-Sheet 1

INVENTOR,
EDWIN H. BECK,

BY Bruninga and Sutherland,
ATTORNEYS.

SKIVING MACHINE

Original Filed April 23, 1953 3 Sheets-Sheet 2

INVENTOR,
EDWIN H. BECK,

BY Bruninga and Sutherland

ATTORNEYS.

SKIVING MACHINE

Original Filed April 23, 1953 3 Sheets-Sheet 3

INVENTOR,
EDWIN H. BECK,
BY Bruninga and Sutherland,
ATTORNEYS.

United States Patent Office

Re. 24,142

Reissued Apr. 17, 1956

24,142

SKIVING MACHINE

Edwin H. Beck, Lemay, Mo., assignor to Manufacturers Supplies Co., St. Louis, Mo., a corporation of Missouri Original No. 2,687,634, dated August 31, 1954, Serial No. 350,672, April 23, 1953. Reissue No. 23,982, dated April 19, 1955, Serial No. 489,314, February 18, 1955. This application for reissue January 9, 1956, Serial No. 558,181

15 Claims. (Cl. 69—9.5)

Matter enclosed in heavy brackets [ ] appears in the first but forms no part of this reissue specification; matter printed in italics indicates the additions made by the first reissue; matter printed in bold face (except reference figures) indicates the additions made by this reissue.

This invention relates to skiving machines, and particularly to machines for use in skiving the margins of shoe parts.

In the manufacture of shoes, it is frequently necessary to provide a blank with several scarfs of different shape. In the case of a shoe upper, for example, a relatively flat, folding cut is made along the top margin for hemming purposes; a gentle bevel is made along the bottom edge where the quarter is secured to the vamp; and a rather steep slanting cut is made along the back edge where the heel or counter part of the shoe is formed.

The machine commonly employed for such skiving is of a type wherein the work is fed between a resiliently-mounted feed roller and a relatively fixed presser foot against the edge of a rotating cylindric knife. In making marginal cuts, the surface of the feed roller and the opposed surface of the presser foot are in general but not necessarily exact parallelism with the upper cutting part of the rotating knife. The position of the presser foot relative to the knife edge determines the character of the scarf, the presser foot being adjustable in elevation to vary the depth of the cut and being angularly adjustable to vary the slant of the cut. In preparing a part, such as the above-described shoe upper, the practice heretofore has been to employ three machines, each of which is set to make a different cut, or the practice has been one of making three different runs on the same machine, with the presser foot being reset between each run. In either case, a given piece of work is handled several times and there is a lack of flexibility in the over-all operation.

It is accordingly an object of the present invention to provide a skiving machine of the character described, which substantially simplifies the handling operations and which offers greater flexibility. More particularly, the invention contemplates a machine that permits an operator to make several different cuts without substantially lifting the piece from the machine or in any way adjusting the machine except by relatively quick treadle action.

To these ends I propose that the skiving machine be provided with an upper actuating lever for varying the elevation of the presser foot and a lower actuating lever for varying the angle of the presser foot relative to the cutting edge of the knife. These actuating levers are mounted for vertical movement and are in turn under the control of at least one, and preferably two, treadle-actuated members, which are mounted for vertical movement from retracted positions to predetermined actuated positions. Adjustably-positionable lever-engaging elements on each of the treadle-actuated members engage the levers and reset the presser foot on manipulation of either member to its predetermined actuated position. In a preferred form of the invention, the presser foot is pivotally carried upon the lower end of a vertically movable support, the upper actuating lever is pivoted adjacent the upper end of this support for cooperation therewith, and the lower lever is fixed to the presser foot.

In use, the machine is adjusted in the usual manner to make a rather shallow and flat cut. The lever-engaging elements are then adjusted to actuate the levers and reposition the presser foot for making cuts of different slope and depth.

Other features of the invention will be in part apparent from and in part pointed out in the following detail description taken in connection with the accompanying drawings, in which.

Figure 1:
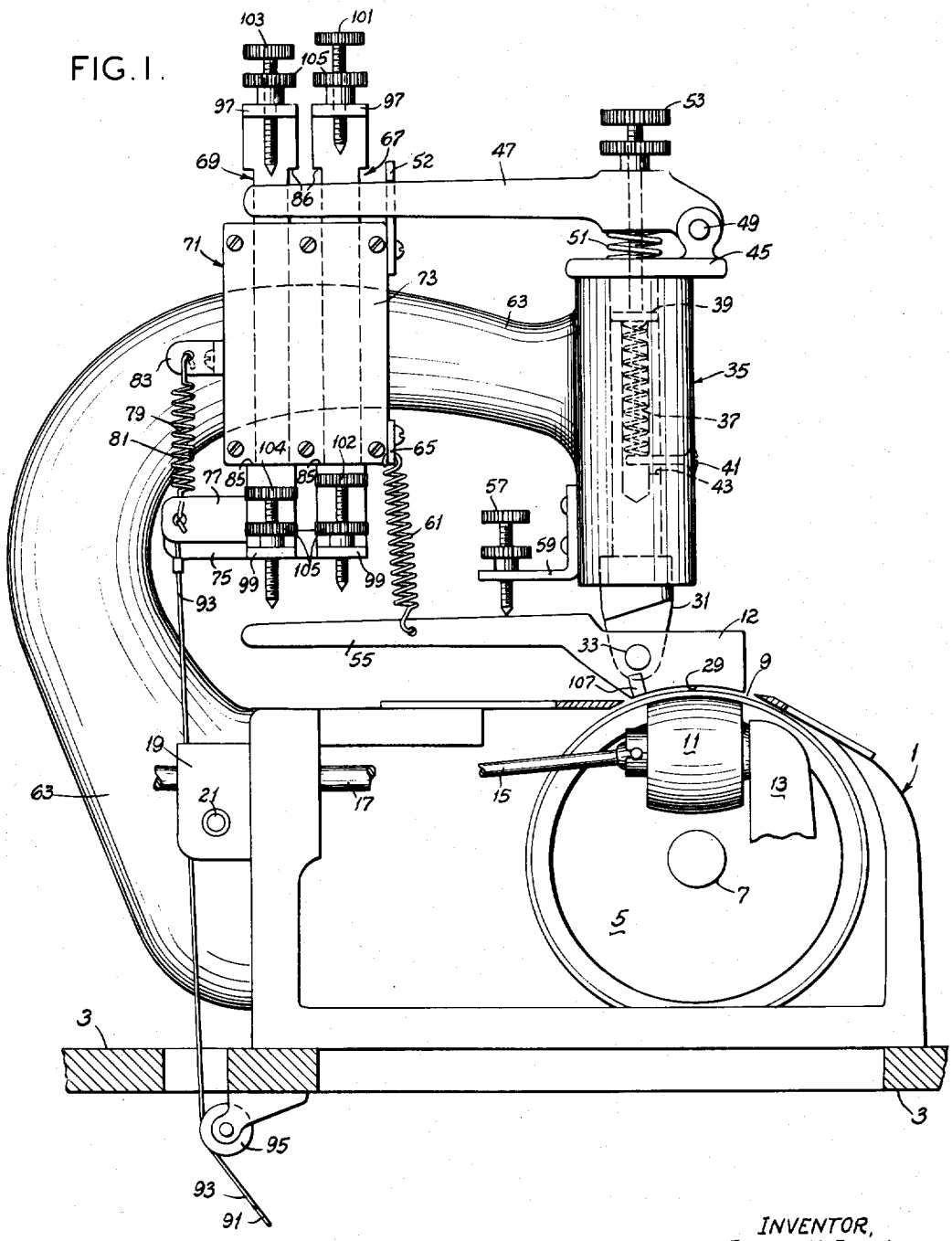
Fig. 1 is an end elevational view of a skiving machine incorporating the mechanism of this invention.

Referring to the drawings, there is shown a skiving machine of a type in general use. The machine includes a housing 1, which functions as a frame enclosing certain operating parts, and which is secured on a workbench partially shown at 3. A cup-like knife 5 is mounted within the housing at one end of a driven shaft 7, which extends longitudinally of the machine. As indicated at 9, an upper cutting part of the knife projects endwise from the upper surface of the housing so that work may be fed thereto in a direction indicated by the arrow. Immediately below the cutting area 9, there is a roller 11 mounted with its axis transverse to the knife axis. This roller may have an emery surface for relatively fine work or a knurled surface for relatively heavy work, the surface being curved in the axial direction so as to fit the curve of the knife.

The work piece is guided by means of a member 12, generally called a presser foot, which is mounted above the feed roller 11 adjacent the cutting part 9 of the knife. While the details of the mechanism for mounting and driving the feed roller are only partially shown herein, they being known in the art, it will be understood that the feed roller is resiliently mounted for both tilting and radial movement in response to movement of the work piece beneath the presser foot. For example, the feed roller may be carried in a yoke (partially shown at 13) which is pivoted along a pair of horizontal axes, one extending transversely and the other parallel to the roller axis to permit both downward and tilting movement of the roller 11. Springs attached to the frame and yoke bias the roller upwardly toward the presser foot.

The feed roller is coupled by a driving shaft member 15 through a universal joint (not shown) to a transverse shaft 17. This shaft 17 is connected at a gear box 19 to a lateral shaft 21, which extends across the rear of the machine. Shaft 21 in turn is belt-connected at 23 to the knife shaft 7, and both are driven from a belt drum 25.

Figure 2:
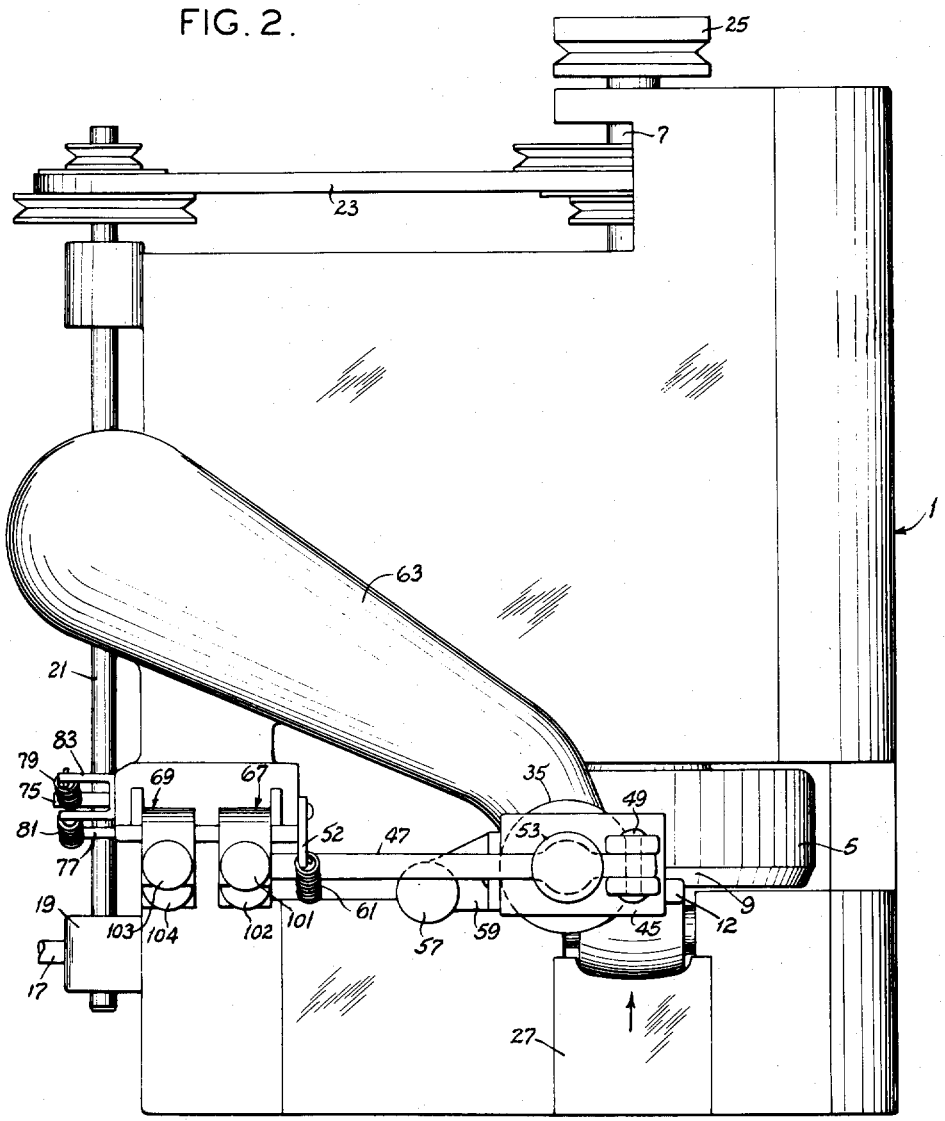
Fig. 2 is a top plan view of the apparatus shown in Fig. 1.
Figure 3:
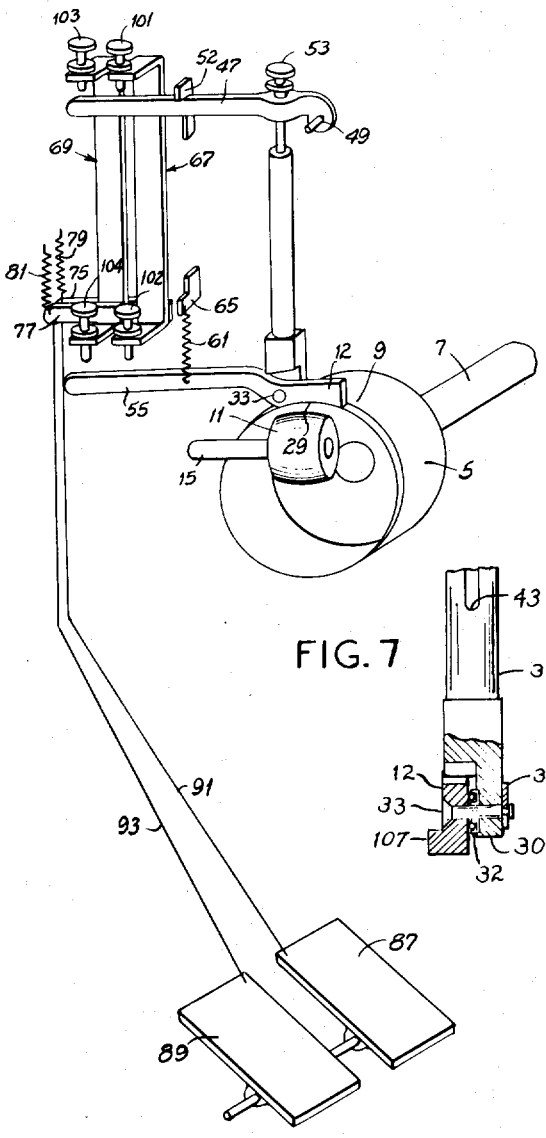
Fig. 3 is a diagrammatic view of the skiving machine, showing the mechanism of this invention.

While the machine may also include a grinding wheel for sharpening the outer surface of the knife and a scrap remover within the knife together with various adjustments for the sharpening wheel, scrap remover, knife and feed roller, these are omitted for purposes of clarity. Also, a guide cover plate 27 shown in Fig. 2 is omitted from the showing of Fig. 1 for purposes of clarity.

In operation, the guide surface 29 of the presser foot functions to guide material against the knife edge 9, the feed roller 11 yielding an amount sufficient to accommodate the work while providing a driving engagement with the work. The character of the cut is determined by the position of the guiding surface 29 of the presser foot relative to the cutting part 9 of the knife.

Figure 7:
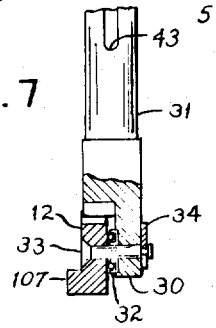
Fig. 7 is a fragmentary sectional view illustrating details of the presser foot and its supporting member.

In accordance with this invention, the presser foot 12 is pivotally mounted upon the lower end of a plunger 31. As shown more particularly in Fig. 7, an extension 30 on the lower end of the plunger carries a ball thrust bearing 32, and the presser foot 12 is mounted against the bearing on a pivot pin 33, which may be removably secured, as by a clip member 34, in order to permit replacement of the presser foot. The plunger 31 is slidably received within a column 35 over the feed roller and is biased upwardly by means of a spring 37, which abuts against a cap 39 screwed into the upper end of the plunger 31. The lower end of the spring 37 seats against a screw 41 fixed in the column 35 and slidably received through a slot 43 in the plunger 31.

At the upper end of the column 35, there is a yoke 45 which pivotally carries an upper actuating lever 47, the lever being pivoted at one end 49 to project horizontally across the plunger 31 toward the rear of the machine. This lever 47 is biased upwardly by a spring 51 against a fixed stop 52 and carries a thumb screw 53, which extends downwardly through the lever into engagement with the top 39 of the plunger. A lower actuating lever 55 extends from the presser foot 12 generally horizontally beneath the other lever 47. The lower lever is also spring-biased upwardly at 61, and a thumb screw 57 carried by a bracket 59 on the fixed column 35 limits upward movement of the lever.

It will be noted that the column 35 is carried upon an arm 63, which projects upwardly and then forwardly from the back of the machine. This arm also supports certain treadle-operated mechanism; and the upper-lever stop 52 as well as a hook 65 for the spring 61 are mounted thereon.

The treadle-operated mechanism includes at least one and preferably two vertically movable members 67 and 69, which in turn carry certain adjustable lever-engaging elements. In the disclosed embodiment, the members 67 and 69 are bars slidably mounted within a fixed guideway 71 and retained therein by a cover plate 73. Arms 75 and 77 projecting rearwardly from the bars 67 and 69, respectively, and spring 79 and 81, respectively, are secured between these arms and a support 83 fixed on the guideway. As such, the bars are biased to predetermined retracted positions, wherein shoulders 85 thereon engage the fixed guideway 71, but are movable to predetermined actuated positions wherein shoulders 86 at their tops engage the upper surface of the guideway. In order to facilitate actuation of the bars, treadles 87 and 89 located beneath the work bench are connected to the bars 67 and 69 through lines 91 and 93, respectively. These lines extend from the treadles about pulleys 95 and through the table to the arms 75 and 77.

Each bar also has an upper foot 97 projecting over the upper lever 47 and a lower foot 99, which extends over the lower actuating lever 55. Thumb screws are threaded through the feet in position for engagement with the levers; there being screws 101 and 102 at the top and bottom of the bar 67 and screws 103 and 104 at the top and bottom of the other bar 69. Locking nuts 105 may also be employed in conjunction with screws, as shown.

Operation of the machine is as follows: The position of the knife is relatively fixed and the feed roller 11 is adjusted through mechanism (not shown) so as to be clear of the presser foot 12. Necessarily, the feed roller moves downwardly against its bias as material is fed beneath the presser foot up against a rear guide 107, which is preferably carried by the presser foot.

Figure 4:
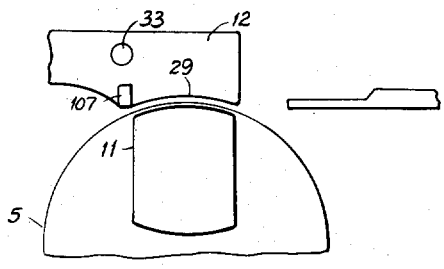
Fig. 4 is a detail view of the feed roller and presser foot, illustrating one type of cut.

Initially, the thumb screw 53 at the top of the plunger is adjusted to provide a predetermined relatively large space between the bottom guide surface 29 of the presser foot and the cutting part 9 of the knife. The amount of this space determines the depth of the initial cut made by the machine. The angle of the presser foot may then be adjusted at the thumb screw 57 in order to make a relatively shallow or flat cut. This general arrangement of the parts and the cut made thereby are shown in Fig. 4 of the drawings, the effect being somewhat exaggerated. The cut shown is of a type particularly useful in folding over and hemming, as along the top of a shoe upper.

Figure 5:
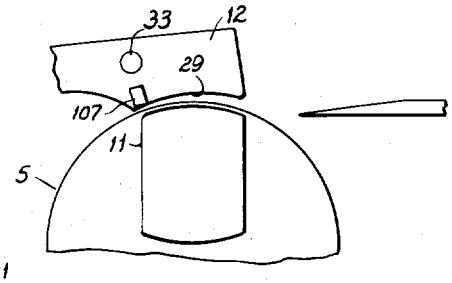
Fig. 5 is a view similar to that of Fig. 4 showing an alternative type of cut.

The machine is prepared for making a different cut by manipulation of one of the treadles, for example, treadle 87. In this case, the screws 101 and 102 for the associated bar 67 are adjusted so that when the treadle is operated and the bar moved from its predetermined retracted position to its predetermined actuated position, one or both of the levers 47 and 55 will be actuated. Lever 47 lowers the presser head whereas lever 55 increases the angle of the presser head and slope of the cut. As shown in Fig. 5, for example, the presser head may be lowered a slight amount and the presser foot adjusted to a slight angle in order to make a relatively gentle sloping cut.

Figure 6:
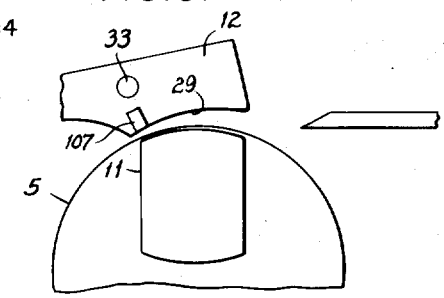
Fig. 6 is a view like that of Fig. 4, showing still another cut.

The other treadle 89 and associated bar 69 are manipulated to prepare the machine for a still different type of cut. In this case, the screws 103 and 104 may be adjusted to project relatively further than the screws 101 and 102, so that the levers 47 and 55 are moved an additional amount. As shown in Fig. 6, for example, the angle of the presser foot is increased in order to make a relatively steep bevel.

From the foregoing description, it will be apparent that a blank of leather requiring several different marginal cuts, such as that used in making the shoe upper, may be quickly and conveniently finished on a single machine. For example, the upper margin of the blank is passed through the machine to make a splitting cut for hemming the edge; one of the treadles is actuated and the blank is rotated on the top of the machine to prepare for skiving the bottom margin of the blank in order to provide a beveled scarf for securing the quarter to the vamp; and then the other treadle is actuated and the blank rotated again in order to pass the back margin of the blank through the machine, thereby making a steep bevel cut for forming a heel part of the upper. Three different cuts are made thus while the blank is hardly lifted from the machine. Moreover, any one or all of the three cuts can be conveniently varied by adjustment of the thumb screws.

Whereas one embodiment of the machine has been disclosed in detail, those skilled in the art should understand that the invention is not limited thereto, but the drawings and description thereof are to be understood as being merely illustrative. For example, instead of the sliding bar and guideway arrangement disclosed herein, there may be pivoted members which carry the adjustable lever-engaging elements. It is realized that many modifications and variations will present themselves to those skilled in the art without departing from the spirit of this invention or the scope thereof as set forth in the appended claims.

Having thus described the invention, what is claimed and desired to be secured by Letters Patent is:

1. In a skiving machine of the type wherein the work piece is fed against a rotary knife from between a feed roller and a presser foot, which foot is pivotally mounted upon a vertically movable support; the improvement comprising a first actuating lever for moving said presser-foot support to vary the elevation of the presser foot with respect to the cutting knife, a second actuating lever coupled to the presser foot to vary the angle thereof with respect to the cutting knife, and at least one treadle-actuated member, said member being movable from a retracted position to a predetermined actuated position, and said treadle-actuated member having first and second lever actuating elements which are adjustably positionable thereon to engage the respective actuating levers at variable points during the movement of the treadle-actuated member to its predetermined actuated position.

2. Apparatus as set forth in claim 1 further including a second treadle-actuated member movable from a retracted position to a predetermined actuated position, said second member also having lever-actuating elements which are adjustably positionable thereon to engage the respective levers at varying points during the movement of the member to its predetermined actuated position.

3. In a skiving machine of the type wherein the work piece is fed against a rotary knife from between a feed roller and a presser foot, which foot is pivotally mounted upon a vertically movable support; an upper actuating lever movable vertically and coupled to said support to depress the presser foot, a lower actuating lever coupled to pivot the presser foot, and at least one slide mounted for vertical movement adjacent the free ends of said actuating levers, a treadle for moving said slide from an upper position to a predertermined lower position, and said slide having upper and lower lever-actuating elements which are adjustably positionable on the slide to engage the upper and lower levers at varying points during movement of the slide to its predetermined lower position.

4. Apparatus as set forth in claim 3 further including a second slide mounted for vertical movement adjacent the free ends of the actuating levers, a second treadle for moving said second slide from an upper position to a predetermined lower position, and said second slide having upper and lower lever-actuating elements which are adjustably positionable on the slide to engage the upper and lower levers at varying points during movement of the slide to its predetermined lower position.

5. Apparatus as set forth in claim 3 wherein said bar has feet projecting over the respective levers and wherein the lever-actuating elements are thumb screws threaded through said feet.

6. Apparatus as set forth in claim 3 wherein the movable support for the presser foot is spring biased upwardly and includes means for adjustably presetting the upper position of the support.

7. Apparatus as set forth in claim 3 wherein the lower actuating member is spring biased upwardly and wherein the apparatus includes adjustable means for presetting the upper position of the lower actuating element.

8. Apparatus as set forth in claim 3, wherein said slide member is spring biased upwardly.

9. In a skiving machine of the type wherein the work piece is fed against a rotary knife from between a feed roller and a presser foot; the improvement comprising treadle-actuated mechanism for changing the angle of the presser foot relative to the knife, said mechanism including a member for actuating the presser foot, a second member arranged for treadle actuation, and a lost-motion connection between said first member and said treadle-actuated member.

10. Apparatus as set forth in claim 9, further including a third member for changing the spacing between the presser foot and the knife, and a lost-motion connection between said third member and said treadle-actuated member.

11. Apparatus as set forth in claim 10, wherein said lost-motion connections are constituted by adjustable elements carried by the treadle-actuated member for engagement with said other members.

12. Apparatus as set forth in claim 9, wherein the presser foot is pivotally mounted upon a support by means of a pivot pin and a ball thrust bearing.

[*13. In a skiving machine having a rotatable knife, a presser-foot support mounted for movement away from and toward the knife, and a presser foot pivotally connected to the presser-foot support; the improvement which comprises means for rocking said presser foot about its pivotal connection with said support, said means being movable into any one of a plurality of predetermined positions, and quick-acting operator-controlled means coupled to actuate said rocking means selectively into one of said predetermined positions.*]

[*14. A skiving machine as set forth in claim 13, further including adjustable means associated with said quick-acting operator-controlled means for controlling the actuation of said rocking means by said quick-acting operator-controlled means.*]

[*15. A skiving machine as set forth in claim 14, further including elevating means for moving the presser-foot support away from and toward the knife, said elevating means being movable into any one of a plurality of predetermined positions, said quick-acting operator-controlled means being coupled to actuate said elevating means selectively into one of said predetermined positions, and adjustable means associated with said quick-acting operator-controlled means for controlling the actuation of said elevating means by said quick-acting operator-controlled means.*]

16. In a skiving machine of the type wherein the work is fed against a rotary knife between a feed roller and a presser foot, which foot is pivotally mounted upon a movable support so as to vary the depth and angle of the cut; the improvement comprising a depth-control actuating element connected to move the support for the presser foot, an angle-control actuating element connected to move the presser foot on its support, a quick-acting operator-controlled means movable between fixed predetermined positions for concomitantly moving both of said actuating elements into variable predetermined positions, an adjustment device for regulating the displacement of said depth-control actuating element in response to movement of said means from one of its predetermined positions to another, and another adjustment device for regulating the displacement of the angle-control actuating element in response to the same movement of said means, both of said adjustment devices being carried by said means and movable therewith through the same amplitude of movement irrespective of the position of said adjustment devices.

17. In a skiving machine of the type wherein work is fed against a rotary knife between a feed roller and a presser foot, the improvement comprising, said rotary knife having a circular cutting edge at one end of a hollow cylindrical blade which is concentric with its axis of rotation, said feed roller being rotatable about an axis transverse to the axis of rotation of said rotary knife and being located adjacent the upper quadrant of said circular cutting edge partly within and partly without the hollow of said cylindrical blade, the surface of said feed roll being convex in the axial direction on substantially the same radius of curvature as said cylindrical blade, said presser foot being located exteriorly of and adjacent the upper quadrant of said circular cutting edge for pressing work against said blade and said roller, said presser foot having a concave work engaging surface curved on substantially the same radius of curvature as said cylindrical blade, said presser foot being movable toward and away from said blade to vary the distance between said concave surface and said cutting edge and thereby vary the depth of the cut in the work, said presser foot also being rockable about an axis substantially parallel with the axis of rotation of said knife to vary the eccentricity of said concave work engaging surface with reference to the axis of said rotary knife and thereby to vary the angularity of the cut in the work; and operator-controlled quick-acting means for moving the presser foot into any one of at least three predetermined positions corresponding respectively to the angularity and depth of different cuts in the work.

18. In a skiving machine of the type wherein work is fed against a rotary knife between a feed roller and a presser foot, the improvement comprising, said rotary knife having a circular cutting edge at one end of a hollow cylindrical blade which is concentric with its axis of rotation, said feed roller being rotatable about an axis transverse to the axis of rotation of said rotary knife and being located adjacent the upper quadrant of said circular cutting edge partly within and partly without the hollow of said cylindrical blade, the surface of said feed roll being convex in the axial direction on substantially the same radius of curvature as said cylindrical blade, said presser foot being located exteriorly of and adjacent the upper quadrant of said circular cutting edge for pressing work against said blade and said roller, said presser foot having a concave work engaging surface curved on substantially the same radius of curvature as said cylindrical blade, said presser foot being movable toward and away from said blade to vary the distance between said concave surface and said cutting edge and thereby vary the depth of the cut in the work, said presser foot also being rockable about an axis substantially parallel with the axis of rotation of said knife to vary the eccentricity of said concave work engaging surface with reference to the axis of said rotary knife and thereby to vary the angularity of the cut in the work; operator-controlled quick-acting means for selectively rocking said presser foot into any one of at least three predetermined positions corresponding respectively to different eccentricities between the concave work engaging surface of said presser foot and the circular cutting edge of said rotary knife, and means coordinated with said quick-acting means for concomitantly controlling the minimum distance between said concave surface and said cutting edge at each of said predetermined positions.

References Cited in the file of this patent or the original patent

UNITED STATES PATENTS 1,944,311 Woodcock et al. -------- Jan. 23, 1934